Sept. 12, 1950      W. X. BROWN      2,521,825
MICROMETER CALIPER
Filed Oct. 11, 1946
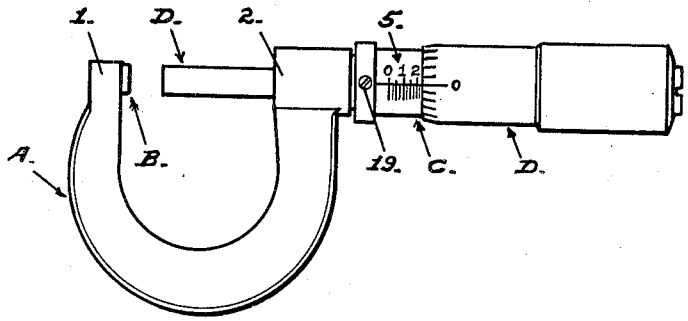
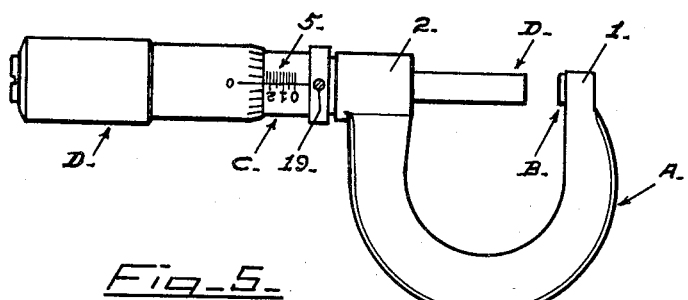
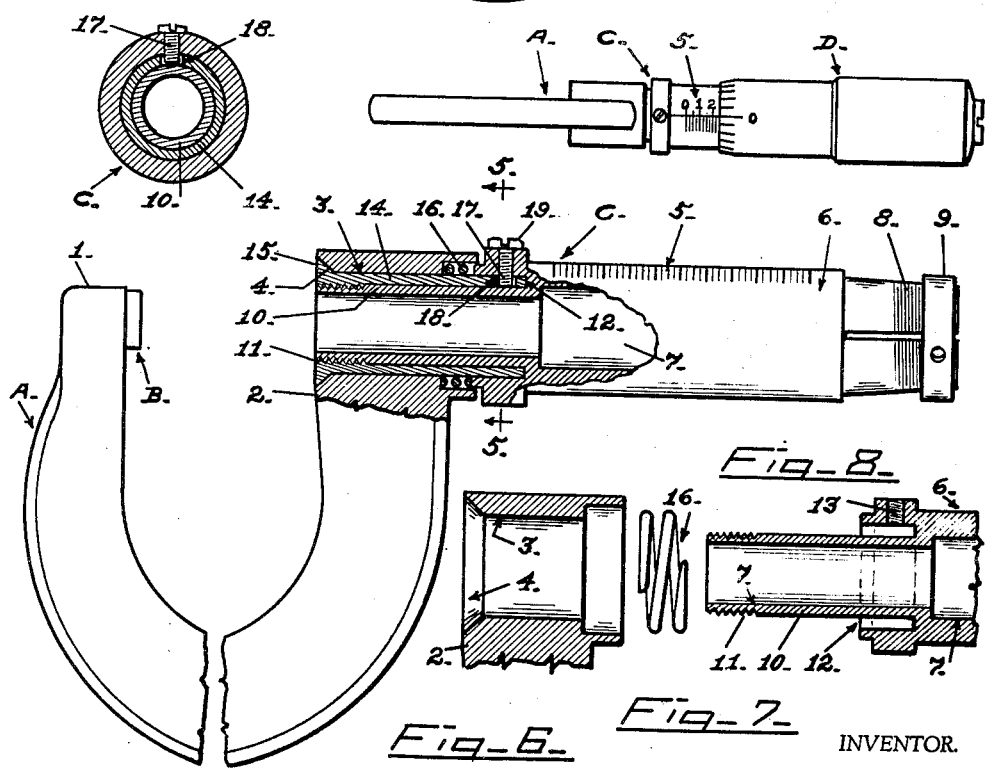
INVENTOR.
William X. Brown.

UNITED STATES PATENT OFFICE 2,521,825

MICROMETER CALIPER

William X. Brown, Los Angeles, Calif.

Application October 11, 1946, Serial No. 702,680

3 Claims. (Cl. 33—166)

This invention relates to micrometer calipers embodying in general; a frame, an anvil, a spindle and thimble assembled in a form well known in the art as providing a means for the gauging of and direct interpretation of dimensions measured by any chosen scale and as existing or as caused to exist by adjustment of the parts defining a spaced relation between the face of the anvil and the opposed end-face of the spindle.

In its present conventional form, the micrometer caliper is essentially a one-hand, the right hand, instrument, that is; the direct reading of measurements, with the instrument in place on the part to be measured, is discernible only when the one side of the instrument frame and the datum line thereon are positioned as facing the operator. In actual use many measurements cannot be gauged except by positioning the instrument, in its conventional form, with the position of the datum line turned away from and without the line of vision of the operator, and the instrument must then be removed from the work and turned over for reading.

In view of the above outline of the qualifications of structure and design of present conventional forms of micrometer calipers rendering necessary the method of use as described:

An object of my invention is to provide a micrometer caliper novel in structure as embodying means whereby the datum line and graduations thereof are rendered positionable at any angle radial to the longitudinal axis of the spindle and as angularly related, as desired, to the plane of the frame, of which plane said axis forms an edge. Said positioning of the datum line, relative to the frame, being provided by rotative movement positioning of the barrel or datum line indicia-carrying part, with respect to the frame.

Another object is to provide a micrometer caliper wherein the barrel thereof is rotatable in the frame and the datum line and graduation thereon rendered positionable relative to the frame; by means exercising the sense of touch.

With the above and other objects in view the invention consists in the novel construction and combination of parts hereinafter described, illustrated in the accompanying drawing, and set forth in the claims hereto appended, it being understood that various changes in form, proportion, size and minor details of construction within the scope of the claims may be resorted to without departing from the spirit or sacrificing any of the advantages of the invention.

In the drawing:

Fig. 1 is a side elevation of a micrometer caliper embodying the present invention characterized as a right hand instrument.

Fig. 2 is a side elevation of the instrument characterized as a left hand instrument.

Fig. 3 is a top plan view of the instrument.

Fig. 4 is an enlarged part elevational part sectional view showing in section the manner of mounting the barrel, the spindle and thimble being omitted.

Fig. 5 is a sectional view taken on the line 5—5 of Fig. 4.

Fig. 6 is an enlarged fragmentary sectional view of the boss on the frame for the barrel.

Fig. 7 is an enlarged side elevation of the spring used in the barrel mounting.

Fig. 8 is an enlarged fragmentary sectional view of the end of the barrel which is mounted on the frame.

Referring to the drawing, it is apparent that the micrometer caliper of my invention consists of parts assembled in conventional form-appearance but embodies novel improvements in view of the above and following characterization:

The present conventional design of micrometer calipers provides a frame and barrel as a relationally fixed or as a one-piece structure having the datum line and graduations thereof directly impressed or as positioned thereon in one only operationally-fixed relation to the one designated position of the frame.

In contradistinction to the above; the micrometer caliper of applicant's design provides means whereby the datum line indicia is positionable in any and all positions angularly relative to the plane of the frame. In other words; with the frame held in any one position the barrel or indicia carrying means is rotatable to and as readily operationally set in any and all positions of a full circle or complete turn of the one relative to the other. In addition to the above "sight-setting" of the relation of parts; means are provided whereby the like or same relation of the parts are obtainable by the exercise of the sense of touch only.

Referring to the drawing in general; the letter A designates the frame having the anvil B, the means C or barrel carrying the datum line indicia as rotatable relative to the frame A during operational use of the instrument, and the conjoined spindle and thimble assembly D.

More specifically the one extremity of the frame, indicated by the numeral 1, serves to mount the anvil B in conventional relation to the frame A. The other extremity 2 of the frame in opposed, spaced relation to the extremity 1; is provided with the bore 3 (Figures 4 and 6), the longitudinal center line axis thereof coaxial with the center line of the anvil. The bore 3 provides for rotational movement of parts mounted therein and having the abutment face 4, the ground surface thereof defining a precision limit stop for means serving to mount the barrel as revolvably disposed in the bore 3 and as maintained in precision spaced relation to the face of the anvil B when force-urged in a direction away therefrom.

The means C or barrel carrying the datum line and indicia 5 relative thereto consists of the body portion 6 adapted to mount and function the spindle and thimble assembly in conventional manner as having the bore 7, (Figure 4), the one end portion thereof internally threaded (not shown) and as rendered adjustable for wear and precision fit by the conventional taper thread 8 and collar 9.

In the one form of mounting of the means C carrying the datum line indicia for rotatable movement thereof for the purpose described relative to the frame A; the means C is provided with the mandrel-like extension 10 having the threads 11, the counterbore 12 and the threaded bore 13. As a means for mounting the barrel C in the bore 3 as precisionally rotatable and as limit-spaced longitudinally therein relative to the face of the anvil; the bushing 14 is provided. This bushing is adapted to close-fit both the mandrel 10 and the bore 3 of the frame A and as having a counter-part thread adapted to engage the threads 11 of the mandrel 10 whereby the counter-part end of the bushing is forced to bottom in the counterbore 12, the bushing being also formed to provide the flange 15 having a counter-part abutment to that of the face 4 of the frame A. These abutments when in contact render the barrel C and indicia thereon precisionally limit-stopped in a spaced, set relation to the face of the anvil in the direction away therefrom, and as maintained in such position by force-urge means such as the compression spring 16 interactive between the frame and barrel as providing constant and uniform contact of the abutments as a precisional limit-stop.

Further, the provision of resilient force-urge means as active to attain and maintain adjustment of the parts resolves the attainment of precisionally space-set relation of the datum line indicia to the face of the anvil; to one only relatively moving metal-to-metal contact relation of parts as being that of the abutment surfaces 4 in spaced relation to the zero indicia and as obtained by the precision bottoming of the end of the bushing 14 in the counterbore 12. Further, the resilient force-urge employed, such as that of the spring 16 graduated by more or less compression thereof, is applicable as providing a smoothly active means of forcing the abutments 4 into frictional contact sufficient to cause the barrel C to retain any desired position of rest in relation to the frame and as resistant to dislodgment rotation therein by any and all rotational movement of the spindle and thimble assembly during calipering uses of the instrument; yet in itself, rendered rotatable to any desired position in the frame.

As a means insuring the relatively locked relation of the bushing 14 on the mandrel 10 the end of the screw 17 engages the hole 18 in the bushing 14. As further adapted to provide means whereby the sense of touch may be employed, as above described for setting the datum line position relative to the frame; the screw 17 and the threaded bore 13 receptive thereof are positioned in the barrel C at the base or beginning of the datum line on the barrel. This position of the screw; provided with the suitably formed knob-head 19 designed to project above the adjacent contour surfaces of the frame and barrel provides means readily perceivable by the sense of touch as indicative of the relation of the datum line position to that of the frame.

Having thus described my invention, I claim:

1. In a micrometer caliper, a frame, an anvil on said frame, said frame having a bore therein in axial alignment with said anvil, a barrel rotatable in said bore and having a datum line thereon which is disposed in different readable positions upon rotation of said barrel, a thimble rotatably supported on said barrel having a vernier scale thereon in juxtaposition to said datum line, a spindle fixed to said thimble and being extended through and axially adjustably associated with said barrel in alignment with said anvil, a bushing rotatably seated in said bore and fixed to said barrel, coacting stop shoulders on said bushing and frame respectively for limiting the movement of said barrel relative to said anvil in a direction away from said anvil, opposed portions on said frame and said barrel, and a coiled spring surrounding said bushing with its ends abutting said opposed portions so as to maintain the barrel in a fixed relation to said anvil and hold said barrel against unintentional turning relative to said frame.

2. In a micrometer caliper, a frame, an anvil on said frame, said frame having a bore therein in axial alignment with said anvil, a barrel rotatable in said bore and having a datum line thereon which is disposed in different readable positions upon rotation of said barrel, a thimble rotatably supported on said barrel having a vernier scale thereon in juxtaposition to said datum line, a spindle fixed to said thimble and being extended through and axially adjustably associated with said barrel in alignment with said anvil, a bushing fixed on said barrel and rotatably seated in said bore, a flange on said bushing abutting a portion of the frame to limit movement of said barrel in a direction away from said anvil, an annular enlargement on said barrel in opposed spaced relation to said frame, said frame having a counterbore at one end of said bore forming a recess around said bushing, and a coiled spring mounted in said recess with its ends abutting the frame and said enlargement for urging said barrel in a direction away from said anvil.

3. In a micrometer caliper, a frame, an anvil on said frame, said frame having a bore therein in axial alignment with said anvil, a barrel rotatable in said bore and having a datum line thereon which is disposed in different readable positions upon rotation of said barrel, a thimble rotatably supported on said barrel having a vernier scale thereon in juxtaposition to said datum line, a spindle fixed to said thimble and being extended through and axially adjustably associated with said barrel in alignment with said anvil, a bushing fixed on said barrel and rotatably seated in said bore, a flange on said bushing abutting a portion of the frame to limit movement of said barrel in a direction away from said anvil, an annular enlargement on said barrel in opposed spaced relation to said frame, said frame having a counterbore at one end of said bore forming a recess around said bushing, and a coiled spring mounted in said recess with its ends abutting the frame and said enlargement for urging said barrel in a direction away from said anvil, said enlargement having an annular recess into which an end of said bushing extends.

WILLIAM X. BROWN.

REFERENCES CITED

The following references are of record in the file of this patent:

UNITED STATES PATENTS

| Number | Name | Date |
|---|---|---|
| 448,089 | Starrett | Mar. 10, 1891 |
| 1,533,787 | Crescio | Apr. 14, 1925 |
| 1,564,857 | Karlsson | Dec. 8, 1925 |

FOREIGN PATENTS

| Number | Country | Date |
|---|---|---|
| 135,051 | Great Britain | Nov. 20, 1919 |
| 232,154 | Switzerland | Apr. 1, 1944 |